(12) United States Patent
Lee et al.

(10) Patent No.: US 11,312,204 B2
(45) Date of Patent: Apr. 26, 2022

(54) APPARATUS AND METHOD FOR CONTROLLING AIR SUSPENSION OF VEHICLE

(71) Applicants: Hyundai Motor Company, Seoul (KR); Kia Motors Corporation, Seoul (KR)

(72) Inventors: Woo Sung Lee, Seoul (KR); Eun Woo Na, Suwon-si (KR); Jae Hyung Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 105 days.

(21) Appl. No.: 16/861,851

(22) Filed: Apr. 29, 2020

(65) Prior Publication Data

US 2021/0138866 A1    May 13, 2021

(30) Foreign Application Priority Data

Nov. 12, 2019  (KR) .......................... 10-2019-0144464

(51) Int. Cl.
*B60G 11/27*  (2006.01)
*B60G 17/052*  (2006.01)
*B60R 11/04*  (2006.01)

(52) U.S. Cl.
CPC .......... *B60G 17/0525* (2013.01); *B60G 11/27* (2013.01); *B60G 17/0528* (2013.01); *B60R 11/04* (2013.01); *B60G 2202/152* (2013.01); *B60G 2400/252* (2013.01); *B60G 2400/823* (2013.01); *B60G 2500/30* (2013.01)

(58) Field of Classification Search
CPC ............... B60G 17/0525; B60G 11/27; B60G 17/0528; B60G 2202/152; B60G 2400/252; B60G 2400/823; B60G 2500/30; B60R 11/04
USPC ........................................... 280/5.507, 5.514
See application file for complete search history.

(56) References Cited

U.S. PATENT DOCUMENTS 8,989,963 B1 *  3/2015  Yellambalase ....... B60G 17/019
                                                   701/37
10,384,508 B2 *  8/2019  Ohashi ............... B60G 17/0155
(Continued)

FOREIGN PATENT DOCUMENTS

KR      20150041994 A      4/2015
KR      20180044344 A      5/2018

*Primary Examiner* — Toan C To
(74) *Attorney, Agent, or Firm* — Slater Matsil, LLP

(57) ABSTRACT

An apparatus and method for controlling an air suspension of a vehicle are disclosed. The apparatus includes a compressor configured to supply compressed air, a reservoir configured to store compressed air supplied from the compressor and to supply the stored compressed air to the air suspension during vehicle height control, a road information provider configured to provide road state information of a road in front of the vehicle during travel of the vehicle, and a controller configured to determine a vehicle height control position of the air suspension based on the road state information and to operate the compressor before the vehicle arrives at the determined vehicle height control position, thereby filling the reservoir with the compressed air such that an internal pressure of the reservoir reaches at least a predetermined reference pressure.

19 Claims, 2 Drawing Sheets

(56) References Cited

U.S. PATENT DOCUMENTS

| | | | |
|---|---|---|---|
| 2006/0293816 A1* | 12/2006 | Li | B60G 17/0523 |
| | | | 701/38 |
| 2007/0200304 A1* | 8/2007 | Brookes | B60G 21/106 |
| | | | 280/5.514 |
| 2014/0095025 A1* | 4/2014 | Gambrall | B60G 17/018 |
| | | | 701/37 |
| 2015/0105977 A1 | 4/2015 | Lee | |
| 2015/0151602 A1* | 6/2015 | Suzuki | B60G 17/017 |
| | | | 280/6.157 |
| 2017/0182857 A1* | 6/2017 | Ohashi | B60G 11/30 |
| 2017/0349023 A1* | 12/2017 | Mori | B60G 17/016 |
| 2017/0363169 A1* | 12/2017 | Bounds | F16F 9/34 |
| 2018/0029432 A1* | 2/2018 | Kondo | B60G 17/0162 |
| 2018/0304718 A1 | 10/2018 | Seto et al. | |
| 2020/0094645 A1* | 3/2020 | Edren | B60G 17/0165 |
| 2021/0178849 A1* | 6/2021 | Park | B60G 17/0182 |

\* cited by examiner

APPARATUS AND METHOD FOR CONTROLLING AIR SUSPENSION OF VEHICLE

CROSS-REFERENCE TO RELATED APPLICATIONS

This application claims priority to Korean Patent Application No. 10-2019-0144464, filed in the Korean Intellectual Property Office on Nov. 12, 2019, which application is hereby incorporated herein by reference.

TECHNICAL FIELD

The present invention relates to an apparatus and method for controlling an air suspension of a vehicle.

BACKGROUND

Generally, a suspension, to which a stainless steel spring is applied, has a limitation in simultaneously satisfying ride comfort and handling stability. For example, when the stainless steel spring is set to be soft, handling stability is degraded. On the other hand, when the stainless steel spring is set to be hard in order to enhance handling stability, ride comfort is degraded. That is, in the case of a suspension to which a soft stainless steel spring is applied, the spring may easily absorb impact caused by a rough road surface and, as such, ride comfort may be enhanced. In this case, however, the vehicle body may be unstable and, as such, handling stability may be degraded. On the other hand, in the case of a suspension to which a hard stainless steel spring is applied, the vehicle body may be stable and, as such, handling stability may be enhanced. In this case, however, it may be impossible to effectively absorb impact transmitted from irregularities of a road surface and, as such, ride comfort may be degraded.

In order to eliminate drawbacks of suspensions employing the above-mentioned stainless steel springs, an air suspension employing an air spring has been developed. The air spring may be varied to be hard or soft through appropriate control of an air pressure therein. In particular, the air spring applied to the air suspension may also adjust the height of the vehicle body (vehicle height) through control of the air pressure therein.

Adjustment of vehicle height using an air spring in conventional cases may be achieved by storing air of a sufficient pressure in a reservoir by a compressor configured to produce compressed air, and supplying high-pressure air from the reservoir to the air spring. In addition, when the pressure in the reservoir is insufficient, the compressor is controlled to operate to supply air stored in the reservoir to the air spring therethrough.

However, air supplied to the air spring through the compressor under the condition that the pressure in the reservoir is insufficient has an insufficient pressure. For this reason, a vehicle height control time is delayed and, as such, there may be a problem in that vehicle height control may not be completed at an appropriate time.

The above matters disclosed in this section are merely for enhancement of understanding of the general background of the invention and should not be taken as an acknowledgement or any form of suggestion that the matters form the related art already known to a person skilled in the art.

SUMMARY

The present invention relates to an apparatus and method for controlling an air suspension of a vehicle. Particular embodiments relate to an apparatus and method for controlling an air suspension of a vehicle, which are capable of previously securing a reservoir pressure based on a travel position of the vehicle, thereby enabling an increase in vehicle height using the air suspension at an appropriate time.

An embodiment of the present invention provides an apparatus and method for controlling an air suspension of a vehicle, which are capable of previously determining a time at which an increase in vehicle height is required, and previously securing a sufficient reservoir pressure based on the determined time in order to achieve effective vehicle height control using the air suspension at an appropriate time.

In accordance with an embodiment of the present invention, the above and other objects can be accomplished by the provision of an apparatus for controlling an air suspension of a vehicle including a compressor configured to supply compressed air, a reservoir configured to store compressed air supplied from the compressor and to supply the stored compressed air to the air suspension during vehicle height control, a road information provider configured to provide road state information of a road in front of the vehicle during travel of the vehicle, and a controller configured to determine a vehicle height control position of the air suspension based on the road state information and to operate the compressor before the vehicle arrives at the determined vehicle height control position, thereby filling the reservoir with compressed air such that an internal pressure of the reservoir becomes a predetermined reference pressure or more.

The controller may calculate a distance between a current position of the vehicle and the vehicle height control position of the air suspension, and may operate the compressor when the distance between the current position of the vehicle and the vehicle height control position is shorter than a predetermined first reference distance, thereby filling the reservoir with compressed air such that the internal pressure of the reservoir becomes the predetermined reference pressure or more.

The controller may check the internal pressure of the reservoir when the distance between the current position of the vehicle and the vehicle height control position of the air suspension is shorter than the predetermined first reference distance, and may operate the compressor when the internal pressure of the reservoir is lower than the predetermined reference pressure, thereby filling the reservoir with compressed air.

The reference pressure may be higher than a recommended minimum pressure of the reservoir determined based on a pressure stipulated in specifications of an air spring provided at the air suspension.

The controller may control the reservoir to supply air to the air suspension when the distance between the current position of the vehicle and the vehicle height control position of the air suspension is shorter than a predetermined second reference distance shorter than the first reference distance.

In accordance with another embodiment of the present invention, there is provided a method for controlling an air suspension of a vehicle including a compressor configured to supply compressed air and a reservoir configured to store compressed air supplied from the compressor and to supply the stored compressed air to an air spring during vehicle height control, including determining whether or not vehicle height control is required, based on road state information, calculating a distance from a current position of the vehicle to a position where vehicle height control is required, when it is determined that vehicle height control is required, and filling the reservoir with compressed air through operation of the compressor such that an internal pressure of the reservoir becomes a predetermined reference pressure or more, when it is determined that the distance from the current position of the vehicle to the vehicle height control position is shorter than a predetermined first reference distance.

The filling the reservoir with compressed air may include checking the internal pressure of the reservoir when the distance between the current position of the vehicle and the vehicle height control position of the air suspension is shorter than the predetermined first reference distance, and operating the compressor when the internal pressure of the reservoir is lower than the predetermined reference pressure, thereby filling the reservoir with compressed air.

The reference pressure may be higher than a recommended minimum pressure of the reservoir determined based on a pressure stipulated in specifications of an air spring provided at the air suspension.

The method may further include controlling the reservoir to supply air to the air spring when the distance between the current position of the vehicle and the vehicle height control position of the air suspension is shorter than a predetermined second reference distance shorter than the first reference distance.

In accordance with the air suspension control apparatus and method of embodiments of the present invention, it may be possible to achieve stable vehicle height control by determining a vehicle height increase position through previous determination as to an obstacle present in front of the vehicle during travel of the vehicle or a road surface state of a road in front of the vehicle using a camera or a navigation, and securing a sufficient internal pressure of the reservoir through operation of the compressor carried out taking into consideration the residual distance from the current position of the vehicle to the vehicle height increase position.

Thus, in accordance with the air suspension control apparatus and method, it may be possible not only to enhance ride comfort of the vehicle, but also to reduce discomfort experienced by passengers of the vehicle.

BRIEF DESCRIPTION OF THE DRAWINGS

The above and other objects, features and other advantages of the present invention will be more clearly understood from the following detailed description taken in conjunction with the accompanying drawings, in which.

Effects attainable in embodiments of the present invention are not limited to the above-described effects, and other effects of embodiments of the present invention not yet described will be more clearly understood by those skilled in the art from the following detailed description.

DETAILED DESCRIPTION OF ILLUSTRATIVE EMBODIMENTS

Hereinafter, an apparatus and method for controlling an air suspension according to various embodiments of the present invention will be described with reference to the accompanying drawings.

Figure 1:
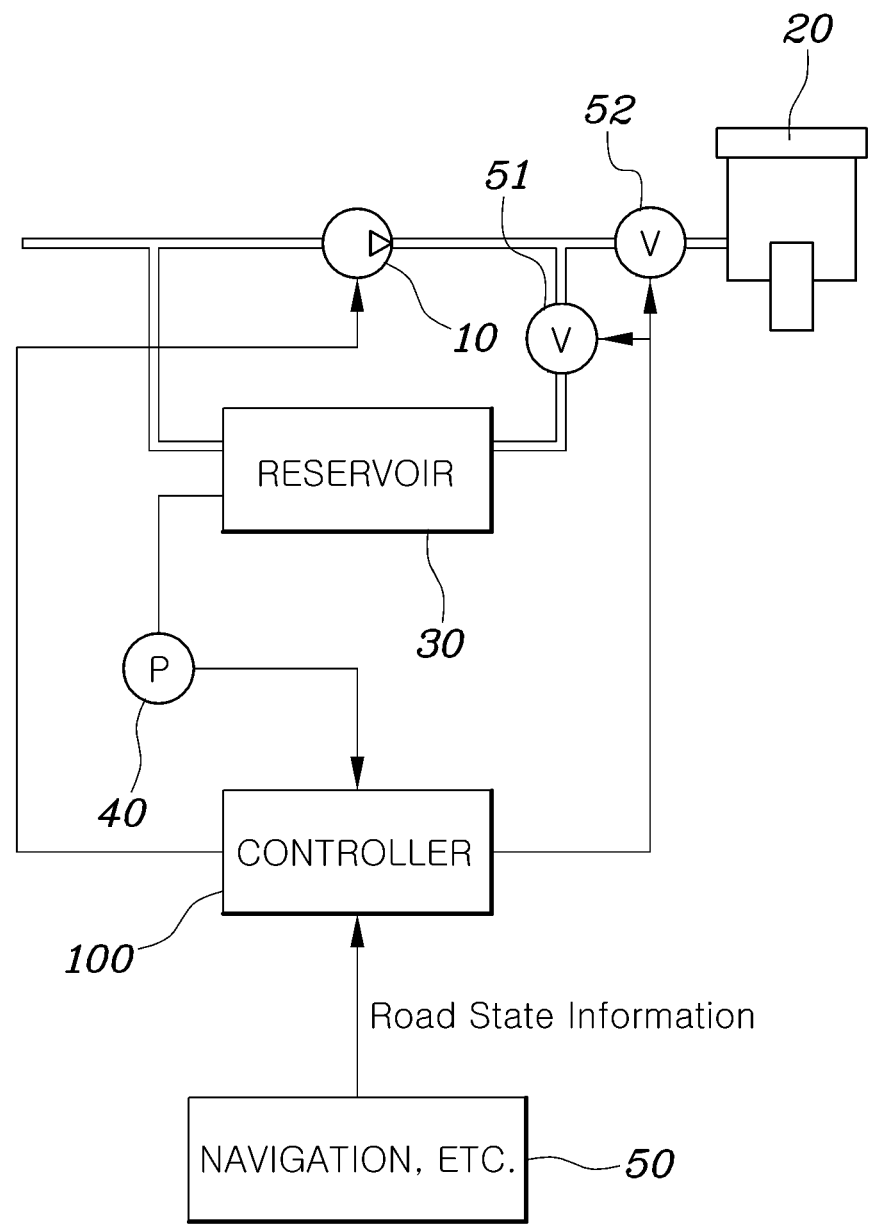
FIG. 1 is a block diagram illustrating a coast regenerative torque application apparatus of a vehicle according to an embodiment of the present invention.

FIG. 1 is a block diagram illustrating a coast regenerative torque application apparatus of a vehicle according to an embodiment of the present invention.

Referring to FIG. 1, the coast regenerative torque application apparatus of the vehicle according to the illustrated embodiment of the present invention may include a compressor 10 configured to supply compressed air, and a reservoir 30 configured to store compressed air supplied from the compressor 10 and to supply the stored compressed air to an air spring 20 of an air suspension during vehicle height control. The coast regenerative torque application apparatus may also include a road information provider 50 configured to provide information of a road in front of the vehicle during travel of the vehicle, and a controller 100 configured to determine a vehicle height control position of the air suspension based on the road information and to operate the compressor 10 before the vehicle arrives at the determined vehicle height control position, thereby filling the reservoir 30 with compressed air such that the internal pressure of the reservoir 30 becomes a predetermined reference pressure or more.

The compressor 10 is a device configured to blow ambient air at a high pressure using a high-speed motor. Compressed air supplied in accordance with operation of the compressor 10 is stored in the reservoir 30.

The reservoir 30 is a kind of tank configured to store compressed air supplied from the compressor 10 at a high pressure. The pressure of air stored in the reservoir 30 may be controlled to be maintained at a predetermined reference pressure or more enabling the air spring 20 of the air suspension to be stably controlled within a desired time.

To this end, a pressure sensor 40 configured to measure an internal pressure of the reservoir 30 may be provided. The pressure sensor 40 may be installed at various positions in accordance with various vehicles. In FIG. 1, an example in which the pressure sensor 40 is directly installed at the reservoir 30 is illustrated. In another example, however, the pressure sensor 40 may be installed at an air transfer line between the reservoir 30 and the air spring 20 and, as such, may detect an internal pressure of the reservoir 30 in accordance with opening/closing states of valves 51 and 52. In this case, for example, when the valve 51, which is installed at the side of the reservoir 30, is opened, and the valve 52, which is installed at the side of the air spring 20, is closed, the pressure sensor 40 installed at the air transfer line between the reservoir 30 and the air spring 20 may measure an internal pressure of the reservoir 30. On the other hand, when the valve 51 installed at the side of the reservoir 30 is closed, and the valve 52 installed at the side of the air spring 20 is opened, the pressure sensor 40 installed at the air transfer line between the reservoir 30 and the air spring 20 may measure an internal pressure of the air spring 20.

The road information provider 50 is an element configured to provide information of a road in front of the vehicle during travel of the vehicle. The road information provider 50 may be embodied through a camera to photograph an image in front of the vehicle or a navigation, etc. installed in the vehicle. The road information provider 50 may detect an irregularity or an obstacle such as a speed bump present on the road in front of the vehicle. Such an irregularity or speed bump corresponds to a position where the vehicle height of the vehicle should be increased through supply of air to the air spring 20 of the air suspension. The road information identified by the road information provider 50 may be provided to the controller 100.

The controller 100 may determine a position where vehicle height control is required, based on the information as to the irregularity or obstacle position provided by the road information provider 50. The controller 100 may then operate the compressor 10 before the vehicle arrives at the position where vehicle height control is required, in order to fill the reservoir 30 with compressed air such that the internal pressure of the reservoir 30 becomes the predetermined reference pressure or more.

In accordance with an exemplary embodiment of the present invention, the controller 100 may be embodied through a non-volatile memory (not shown) configured to store an algorithm configured to control operation of various constituent elements of the vehicle or data as to software commands for execution of the algorithm, and a processor (not shown) configured to execute operation, as will be described hereinafter, using the data stored in the memory. Here, the memory and the processor may be embodied as individual chips, respectively. Alternatively, the memory and the processor may be embodied as a single unified chip. The processor may take the form of one or more processors.

The controller 100 may calculate a distance from the vehicle to the vehicle height control position using information as to a road surface state and an obstacle position provided by the road information provider 50. For example, the controller 100 may determine whether or not the road surface state or the obstacle position provided by the road information provider 50 is an object requiring an increase in vehicle height. Upon determining that the road surface state or the obstacle position is an object requiring an increase in vehicle height, the controller 100 may calculate a distance from the current position of the vehicle to the vehicle height increase position.

In addition, when the residual distance from the current position of the vehicle to the vehicle height increase position is shorter than a predetermined first reference distance, the controller 100 may check the internal pressure of the reservoir 30. When the internal pressure of the reservoir 30 is lower than the predetermined reference pressure, the controller 100 may operate the compressor 10 to fill the reservoir 30 with compressed air such that the internal pressure of the reservoir 30 increases sufficiently.

On the other hand, when the vehicle moves closer to the vehicle height increase position and, as such, the residual distance from the current position of the vehicle to the vehicle height increase position is shorter than a predetermined second reference distance shorter than the predetermined first reference distance, the valves 51 and 52 installed between the reservoir 30 and the air spring 20 of the air suspension may be opened such that high-pressure air is supplied to the air spring 20 to increase the vehicle height.

Here, it is preferred that the reference pressure as a reference of determination as to whether or not the compressor 10 should operate to fill the reservoir 30 with air be higher than a minimum pressure generally recommended for the reservoir 30. For example, when the pressure recommended for appropriate supply of air to the air spring 20 is 12 bar at a minimum, the reference pressure is preferably about 15 bar to be higher than the minimum requirement pressure.

The recommended pressure of the reservoir 30 may be determined in accordance with specifications of the air spring 20. For example, when the required pressure determined in specifications of the air spring 20 is 8 to 10 bar, the recommended pressure of the reservoir 30 may be determined to be 12 to 18 bar higher than a maximum pressure determined in specifications of the air spring 20.

In an embodiment of the present invention, the controller 100 may perform control to previously fill the reservoir 30 with air at a pressure higher than a recommended minimum pressure of the reservoir 20 such that air is more rapidly supplied to the air spring 20 at a position where vehicle height increase is required. Accordingly, rapid vehicle height increase may be achieved. Meanwhile, even when unexpected vehicle height control occurs frequently, it may be possible to reduce the time taken for subsequent vehicle height control because a predetermined reserve air pressure may always be secured.

Figure 2:
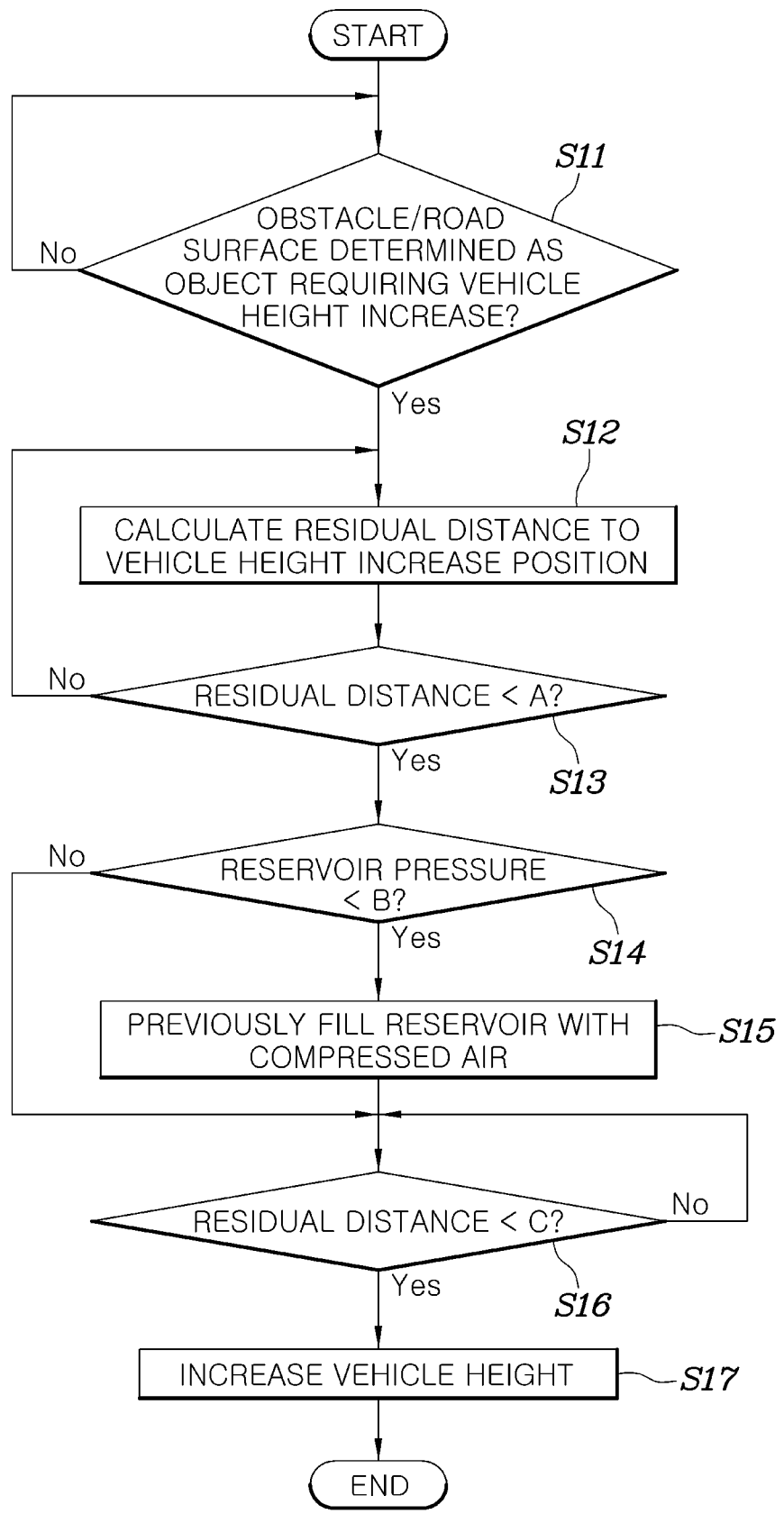
FIG. 2 is a flowchart illustrating an air suspension control method according to an embodiment of the present invention using the above-described air suspension control apparatus.

FIG. 2 is a flowchart illustrating an air suspension control method according to an embodiment of the present invention using the above-described air suspension control apparatus.

Referring to FIG. 2, the air suspension control method according to the illustrated embodiment of the present invention may start from step S11 of receiving, by the controller 100, road state information of a road in front of the vehicle during travel of the vehicle when the road information provider 50 provides the road state information, checking, by the controller 100, whether or not the road state information includes an irregularity or an obstacle, based on the road state information, and determining, by the controller 100, whether or not a vehicle height of the vehicle should be increased through supply of air to the air spring 20 in the air suspension of the vehicle, based on the checked road state information.

Thereafter, upon determining that there is an object requiring vehicle height increase, based on the road state information, the controller 100 may identify a position where the object requiring vehicle height increase is present, and may calculate a residual distance from the current position of the vehicle to the position where the object requiring vehicle height increase is present (S12).

The residual distance calculation in step S12 may be carried out using technologies known in the technical field to which the present invention pertains. For example, when the road information provider 50 is a camera, it may be possible to calculate the residual distance by analyzing a position of an object present in an image photographed by the camera as a reference, such as a lane marking line, an avenue, or a street light and a position of an object requiring vehicle height increase (an irregularity or an obstacle). In another example, when the road information provider 50 is a navigation, it may be possible to derive the residual distance from the current position of the vehicle to the object requiring vehicle height increase.

Subsequently, upon determining that the residual distance from the current position of the vehicle to the object requiring vehicle height increase is shorter than a predetermined first reference distance A (S13), the controller 100 may check an internal pressure of the reservoir 30. When the internal pressure of the reservoir 30 is lower than a predetermined reference pressure B (S14), the controller 100 may then operate the compressor 10 to fill the reservoir 30 with air such that the internal pressure of the reservoir 30 increases sufficiently (S15). When the internal pressure of the reservoir 30 is not lower than the predetermined reference pressure B (No at S14), the method may bypass S15.

Thereafter, when the residual distance from the current position of the vehicle to the vehicle height increase position is shorter than a predetermined second reference distance C, which is shorter than the predetermined first reference distance A, as the vehicle moves very close to the vehicle height increase position (S16), the controller 100 opens the valves 51 and 52 installed between the reservoir 30 and the air spring 20 of the air suspension such that high-pressure air is supplied to the air spring 20 to increase the vehicle height (S17).

As is apparent from the above description, the air suspension control apparatus and method of embodiments of the present invention may achieve stable vehicle height control by determining a vehicle height increase position through previous determination as to an obstacle present in front of the vehicle during travel of the vehicle or a road surface state of a road in front of the vehicle using a camera or a navigation, and securing a sufficient internal pressure of the reservoir through operation of the compressor carried out taking into consideration the residual distance from the current position of the vehicle to the vehicle height increase position. Thus, in accordance with the air suspension control apparatus and method, it may be possible not only to enhance ride comfort of the vehicle, but also to reduce discomfort experienced by passengers of the vehicle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for controlling an air suspension of a vehicle comprising:
    a compressor configured to supply compressed air;
    a reservoir configured to store compressed air supplied from the compressor and to supply the stored compressed air to the air suspension during vehicle height control;
    a road information provider configured to provide road state information of a road in front of the vehicle during travel of the vehicle; and
    a controller configured to determine a vehicle height control position of the air suspension based on the road state information and to operate the compressor before the vehicle arrives at the determined vehicle height control position, thereby filling the reservoir with the compressed air such that an internal pressure of the reservoir reaches at least a predetermined reference pressure;
    wherein the controller is further configured to calculate a distance between a current position of the vehicle and the vehicle height control position of the air suspension, and to operate the compressor when the distance between the current position of the vehicle and the vehicle height control position is shorter than a predetermined first reference distance, thereby filling the reservoir with the compressed air such that the internal pressure of the reservoir reaches at least the predetermined reference pressure.

2. The apparatus according to claim 1, wherein the controller is configured to check the internal pressure of the reservoir when the distance between the current position of the vehicle and the vehicle height control position of the air suspension is shorter than the predetermined first reference distance, and to operate the compressor when the internal pressure of the reservoir is lower than the predetermined reference pressure, thereby filling the reservoir with the compressed air.

3. The apparatus according to claim 2, wherein the reference pressure is higher than a recommended minimum pressure of the reservoir determined based on a pressure stipulated in specifications of an air spring provided at the air suspension.

4. The apparatus according to claim 1, wherein the controller is configured to control the reservoir to supply the compressed air to the air suspension when the distance between the current position of the vehicle and the vehicle height control position of the air suspension is shorter than a predetermined second reference distance, wherein the predetermined second reference distance is shorter than the predetermined first reference distance.

5. A method for controlling an air suspension of a vehicle including a compressor configured to supply compressed air and a reservoir configured to store compressed air supplied from the compressor and to supply the stored compressed air to an air spring during vehicle height control, the method comprising:
    determining whether or not vehicle height control is required, based on road state information;
    calculating a distance from a current position of the vehicle to a vehicle height control position, when it is determined that vehicle height control is required; and
    filling the reservoir with the compressed air through operation of the compressor such that an internal pressure of the reservoir reaches at least a predetermined reference pressure, when it is determined that the distance from the current position of the vehicle to the vehicle height control position is shorter than a predetermined first reference distance.

6. The method according to claim 5, wherein filling the reservoir with the compressed air comprises:
    checking the internal pressure of the reservoir when the distance between the current position of the vehicle and the vehicle height control position is shorter than the predetermined first reference distance; and
    operating the compressor when the internal pressure of the reservoir is lower than the predetermined reference pressure, thereby filling the reservoir with the compressed air.

7. The method according to claim 5, wherein the predetermined reference pressure is higher than a recommended minimum pressure of the reservoir determined based on a pressure stipulated in specifications of the air spring provided at the air suspension.

8. The method according to claim 5, further comprising:
    controlling the reservoir to supply the compressed air to the air spring when the distance between the current position of the vehicle and the vehicle height control position is shorter than a predetermined second reference distance, wherein the predetermined second reference distance is shorter than the predetermined first reference distance.

9. A method for controlling an air suspension of a vehicle, the method comprising:
    storing compressed air in a reservoir;
    determining whether vehicle height control is required;
    calculating a distance from a first position of the vehicle to a vehicle height control position, when it is determined that the vehicle height control is required;
    determining whether the calculated distance is shorter than a predetermined first reference distance;
    when it is determined that the calculated distance is less than the predetermined first reference distance, checking an internal pressure of the reservoir; and
    when it is determined that the internal pressure of the reservoir is lower than a predetermined reference pressure, filling the reservoir with additional compressed air such that the internal pressure of the reservoir reaches at least the predetermined reference pressure.

10. The method according to claim 9, wherein determining whether the vehicle height control is required comprises:
   receiving road state information of a road in front of the vehicle;
   checking whether the road state information includes an irregularity or an obstacle; and
   determining whether a vehicle height of the vehicle should be increased based on the checked road state information.

11. The method according to claim 10, wherein the vehicle height control position includes a position of the irregularity or a position of the obstacle included in the road state information.

12. The method according to claim 9, wherein the predetermined reference pressure is higher than a recommended minimum pressure of the reservoir.

13. The method according to claim 12, wherein the recommended minimum pressure of the reservoir is determined based on a pressure stipulated in specifications of an air spring provided at the air suspension.

14. The method according to claim 9, wherein it is determined that the vehicle height control is required, the method further comprising:
   calculating a residual distance from a second position of the vehicle to the vehicle height control position; and
   supplying the compressed air in the reservoir to an air spring when the residual distance is less than a predetermined second reference distance, wherein the predetermined second reference distance is less than the predetermined first reference distance.

15. The method according to claim 14, wherein supplying the compressed air in the reservoir to the air spring comprises opening at least one valve installed between the reservoir and the air spring.

16. The method according to claim 14, wherein supplying the compressed air in the reservoir to the air spring increases a height of the vehicle.

17. The method according to claim 9, wherein the internal pressure of the reservoir is not lower than the predetermined reference pressure, the method further comprising:
   calculating a residual distance from a second position of the vehicle to the vehicle height control position; and
   increasing a vehicle height of the vehicle when the residual distance is less than a predetermined second reference distance.

18. The method according to claim 17, wherein the predetermined second reference distance is less than the predetermined first reference distance.

19. The method according to claim 17, wherein increasing the vehicle height comprises supplying the compressed air in the reservoir to an air spring by opening at least one valve installed between the reservoir and the air spring.

* * * * *